(12) United States Patent
Metzler

(10) Patent No.: US 7,905,054 B1
(45) Date of Patent: Mar. 15, 2011

(54) MACHINE FOR THE FIELD INOCULATION OF CORN WITH BACTERIAL PATHOGENS

(75) Inventor: Joseph T. Metzler, Homer, IL (US)

(73) Assignee: Agrigenetics Inc., Indianpaolis, IN (US)

( * ) Notice: Subject to any disclaimer, the term of this patent is extended or adjusted under 35 U.S.C. 154(b) by 233 days.

(21) Appl. No.: 12/256,801

(22) Filed: Oct. 23, 2008

Related U.S. Application Data

(60) Provisional application No. 61/001,502, filed on Nov. 1, 2007.

(51) Int. Cl.
*A01M 7/00* (2006.01)
(52) U.S. Cl. .............................................. 47/57.5; 47/1.7
(58) Field of Classification Search .................. 47/57.5, 47/1.5, 1.7
See application file for complete search history.

(56) References Cited

U.S. PATENT DOCUMENTS

| | | | | | |
|---|---|---|---|---|---|
| 2,261,368 | A | * | 11/1941 | Hecht | 435/254.1 |
| 2,309,391 | A | * | 1/1943 | Hecht | 47/57.5 |
| 2,826,866 | A | * | 3/1958 | Utterback | 47/57.5 |
| 2,988,849 | A | * | 6/1961 | Laughlin | 47/1.5 |
| 3,728,817 | A | * | 4/1973 | Huey et al. | 800/271 |
| 4,383,389 | A | * | 5/1983 | Bezzerides | 47/1.41 |
| 5,724,765 | A | * | 3/1998 | Wegner | 47/1.5 |
| 2008/0312635 | A1 | * | 12/2008 | Rad | 604/506 |

* cited by examiner

*Primary Examiner* — Rob Swiatek
*Assistant Examiner* — Kristen Hayes
(74) *Attorney, Agent, or Firm* — Eric J. Kraus

(57) ABSTRACT

An inoculation apparatus is disclosed whereby plants may be inoculated with a pathogen. The inoculation apparatus may includes a plurality of wound members and one or more pads. The pathogen is provided in an inoculum. In one example, the pressure of the inoculum is up to about 2 psi.

17 Claims, 5 Drawing Sheets

MACHINE FOR THE FIELD INOCULATION OF CORN WITH BACTERIAL PATHOGENS

PRIORITY CLAIM

This application claims a priority based on provisional application 61/001,502 which was filed in the U.S. Patent and Trademark Office on Nov. 1, 2007, the entire disclosure of which is hereby incorporated by reference.

BACKGROUND AND SUMMARY OF THE INVENTION

The present invention relates generally to devices to inoculate plant life with biological pathogens and in particular to inoculation devices for the inoculation of crops, such as corn, with bacterial pathogens.

Historically there has been a desire to screen Mycogen inbreeds and hybrids against the bacterial pathogens causing various diseases. Exemplary diseases include Stewart's Wilt and Leaf Blight (SWLB) and Goss's Wilt (GW).

The traditional method of an inoculation includes the use of two boards hinged together. The boards include a bed of nails embedded in an inoculum soaked sponge on the bottom of both boards. The bed of nails serves to wound the plant and deliver the inoculum. The two boards are held by an operator walking through the field and manually opened and closed to wound each plant. This method is labor intensive and suffers from built-in inoculator and worker variation. Efforts have been made to produce a machine that would simultaneously wound and inoculate a plant.

A prior art attempt was a recirculating solid stream spraying machine developed for the inoculation of MDNV. The machine used a solid stream of inoculum to force viral particles into the tissue of the plant causing a water soaked wound. The necessary pressure to cause the visible water soaked wound was between 60 and 80 PSI. The inoculation did not result in any visible symptoms on the plants and tests of the inoculum before and after showed the technique was killing most of the bacteria. It was believed that the violent decompression at the nozzle was destroying the bacterial cells.

In a exemplary embodiment of the present disclosure, an inoculations system is provided. The inoculation system being for use with a vehicle to inoculate plants arranged in a row with a pathogen. The inoculation system comprising a frame supported by the vehicle and a feed system which receives in series the plants arranged in the row. The feed system also provides a plurality of wounds in each of the received plants with a plurality of wound members and communicates the pathogen to the plurality of wounds. The inoculation system further comprises a drive system which moves the plurality of wounds members relative to the received plants.

In another exemplary embodiment of the present disclosure, an inoculations system for use with a vehicle to inoculate plants arranged in a row with a pathogen is provided. The inoculation system comprising a frame supported by the vehicle; means for capturing a plant of the plants arranged in the row; and means for wounding the plant captured by the means for capturing, wherein the pathogen is introduced into the wounds of the plant captured by the means for capturing.

In a further exemplary embodiment of the present disclosure, a method for inoculating plants arranged in a row with a pathogen is provided. The method comprising the steps of driving a vehicle along the row, the vehicle transporting a plurality of moveable wound members and a reservoir containing an inoculum containing the pathogen; capturing a plant of the row; wounding the plant with the plurality of wound members causing a plurality of wounds; and communicating the pathogen to the plurality of wounds.

In yet another exemplary embodiment of the present disclosure, a method for inoculating plants arranged in a row with a pathogen is provided. The method comprising the steps of driving a vehicle along the row at a first speed, the vehicle transporting an inoculation system including a plurality of wound members and a reservoir containing an inoculum containing the pathogen; capturing a plant in the row between a first moveable member of the inoculation system positioned on a first side of the row and a second moveable member of the inoculation system on a second side of the row, at least one of the first moveable member and the second moveable member supporting the plurality of wound members; driving at least one of the first moveable member of the inoculation system and the second moveable member of the inoculation system at a second speed, the second speed being based on the first speed of the vehicle; piercing the plant with at least a portion of the plurality of wound members causing a plurality of wounds; and communicating the pathogen to the plurality of wounds.

In still a further exemplary embodiment of the present disclosure, an apparatus for inoculating plants in a field with a pathogen is provided. The plants being arranged in a plurality of rows. The apparatus comprising a frame having a first frame portion and a second frame portion, the second frame portion being moveable relative to the first frame portion; a plurality of ground engaging member coupled to the first frame portion; an engine operatively coupled to at least one of the plurality of ground engaging members to propel the apparatus through the movement of the at least one of the plurality of ground engaging members; a first moveable member positioned on a first side of a first row; and a second moveable member positioned on a second side of the first row. The plurality of ground engaging members being spaced to be located between respective rows. The frame spanning at least one row. The first moveable member and the second moveable member cooperating to capture a plant in the first row while the plant is wounded with a plurality of moveable wound members supported by least one of the first moveable member and the second moveable member. The apparatus further comprising a pathogen delivery system supported by the frame and a drive system coupled to at least one of the first moveable member and the second moveable member to move the plurality of moveable wounds members relative to the captured plants. The pathogen delivery system providing an inoculum containing the pathogen to the wounds of the plant caused by the plurality of wound members.

Additional features and advantages of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention.

Figure 1:
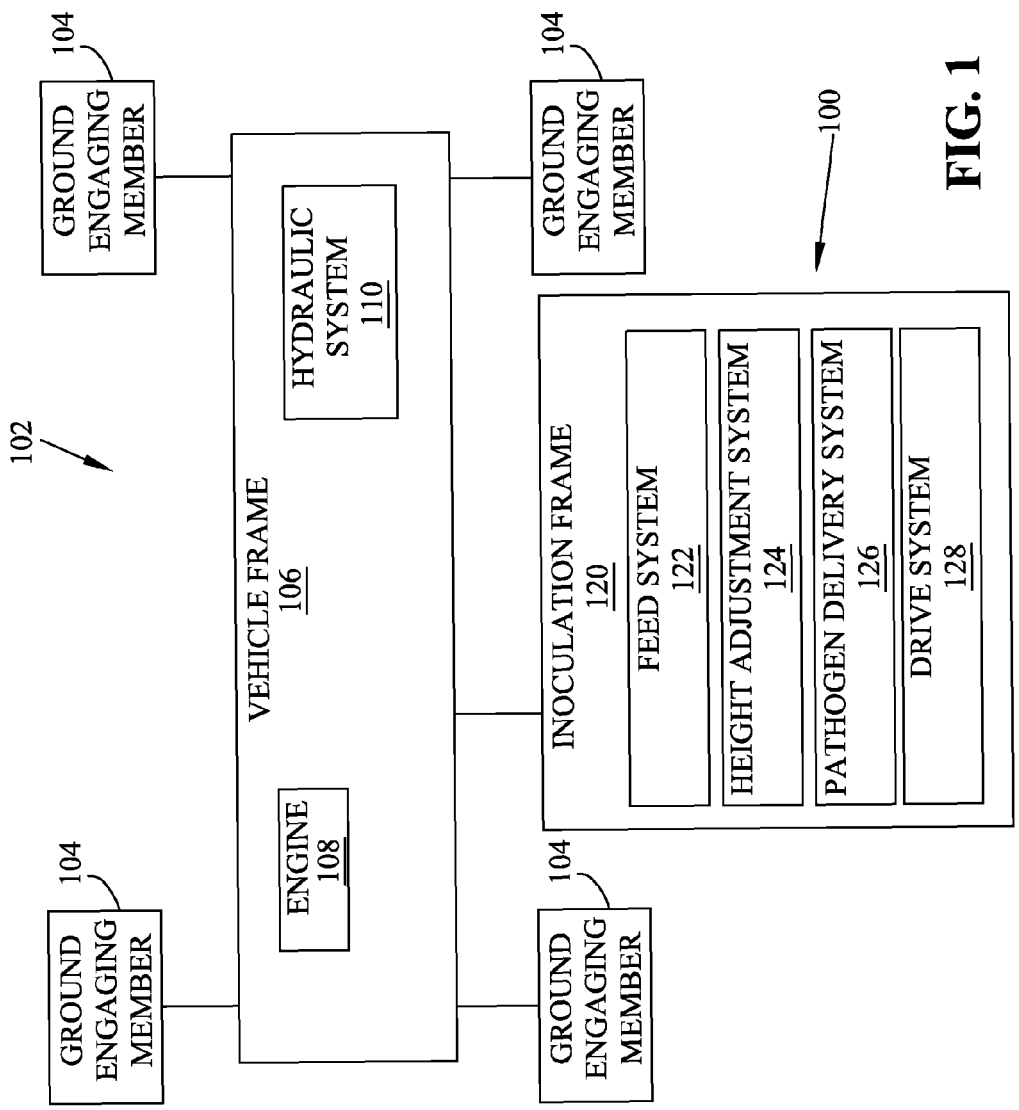
FIG. 1 is a representative view of a vehicle and an inoculation system.

Referring to FIG. 1, an inoculation system 100 is represented. Inoculation system 100 wounds plants and provides an inoculum containing the pathogen to the wounds of the plant. The pathogen is delivered at a pressure to maintain the vitality of the pathogen.

Inoculation system 100 is configured for use with a vehicle 102. In one embodiment, inoculation system 100 is supported by vehicle 102. In one embodiment, inoculation system 100 is a separate unit coupled to vehicle 102, such as a pull-behind unit.

Vehicle 102 includes a plurality of ground engaging members 104. Exemplary ground engaging members include wheels and tracks. Vehicle 102 includes a vehicle frame 106 which supports, among other components, an engine 108 and a hydraulic system 110. As is known, engine 108 provides power to one or more of ground engaging members 104 to propel vehicle 102 relative to the ground. Hydraulic system 110 provides a pressurized hydraulic fluid, which may be used by hydraulic cylinders to adjust the relative placement or orientation of various components. Exemplary vehicles include tractors, all-terrain vehicles, utility vehicles, and other suitable types of vehicles.

Figure 4:
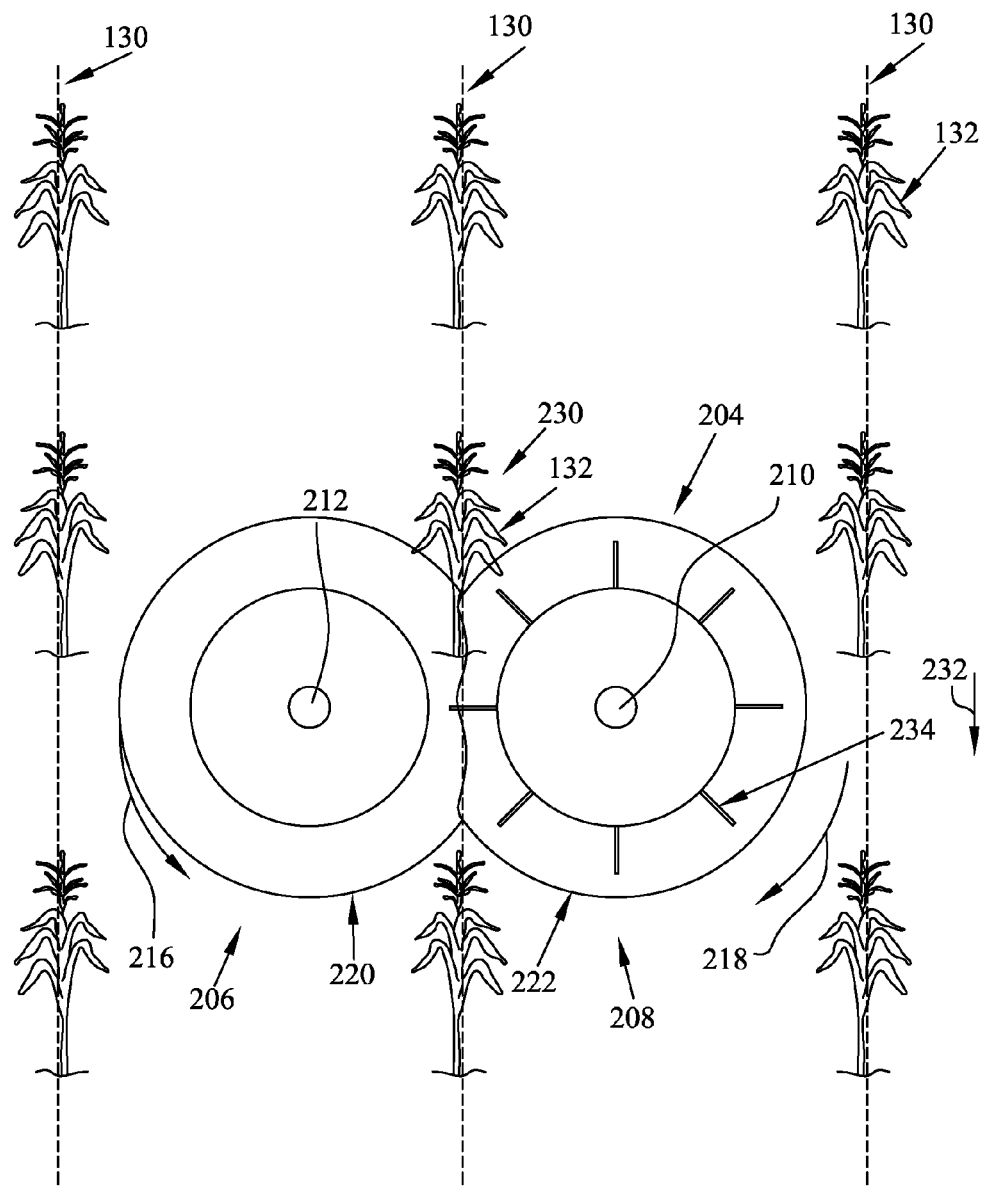
FIG. 4 is a representative top view of the operation of the inoculation system of FIG. 2.

Inoculation system 100 includes a frame 120, which is coupled to vehicle frame 106. Inoculation system 100 further includes a feed system 122, which is positioned to align with a row 130 (see FIG. 4) of plants 132 and to provide the wounds on each plant. Referring to FIG. 4, plants 132 are arranged in a plurality of rows 130. In general, feed system 122 is sized to interact with a given row 130 of plants without causing damage to adjacent rows 130 of plants 132.

A height adjustment system 124 is provided to adjust the relative height of feed system 122 relative to the ground. Exemplary height adjustment system includes one or more hydraulic cylinders coupled to the hydraulic system 110 of vehicle 102. The one or more hydraulic cylinders cooperative with frame 120 to adjust the height of feed system 122. In one embodiment, height adjustment system 124 also adjusts the lateral position of feed system 122.

Inoculation system 100 further includes a pathogen delivery system 126, which provides the biological pathogens to feed system 122 for application to the plants. In one embodiment, the biological pathogens are provided in a liquid inoculum that is stored in a reservoir of the pathogen delivery system 126. Exemplary biological pathogens include *Erwinia stewartii* and *Clavibacter michaganensis* subsp. *nebraskensis*.

Inoculation system 100 further includes a drive system 128. Drive system 128 controls the operation speed of feed system 122. In one embodiment, drive system 128 operates feed system 122 at a first speed generally equal to a ground speed of vehicle 102. In one embodiment, drive system 128 operates feed system 122 at a speed slightly higher than the ground speed of vehicle 102.

Figure 2:
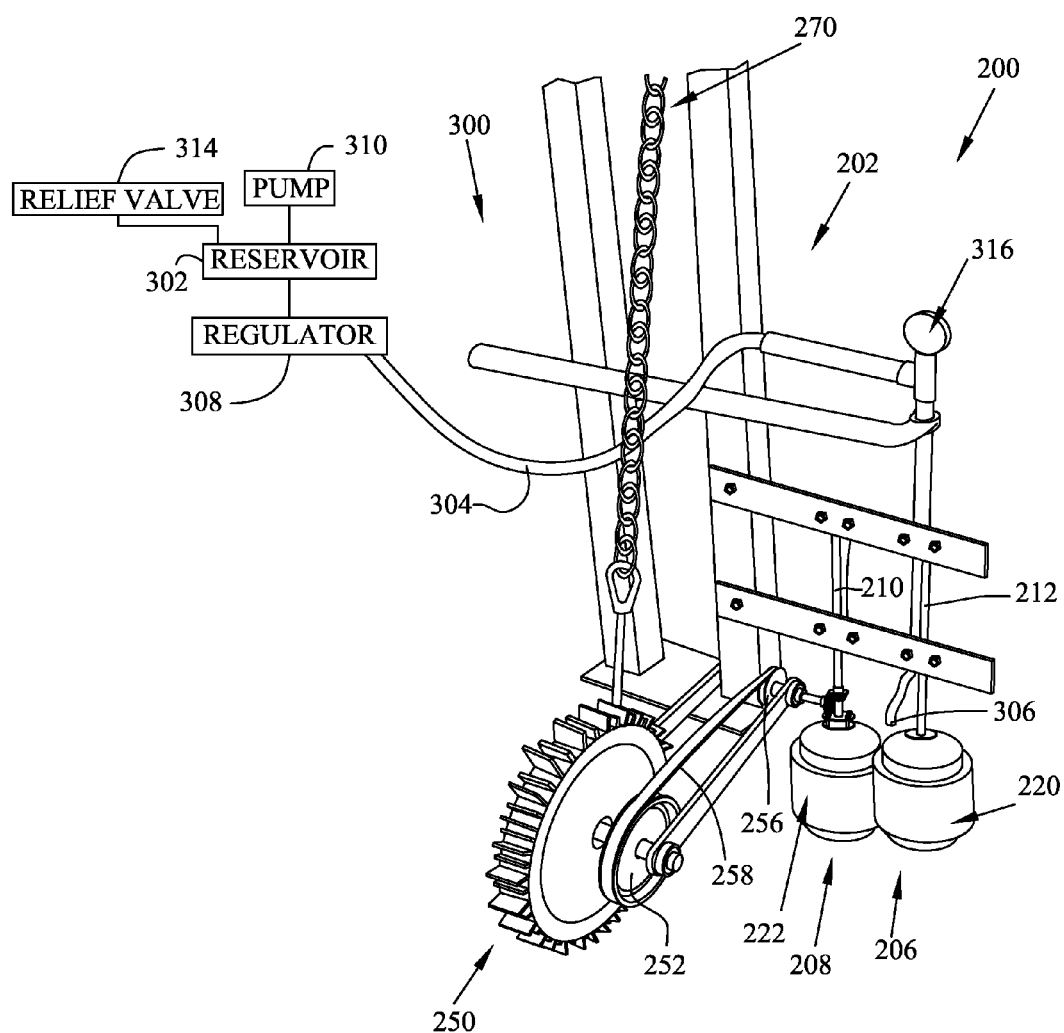
FIG. 2 is a perspective view of an exemplary inoculation system.
Figure 3:
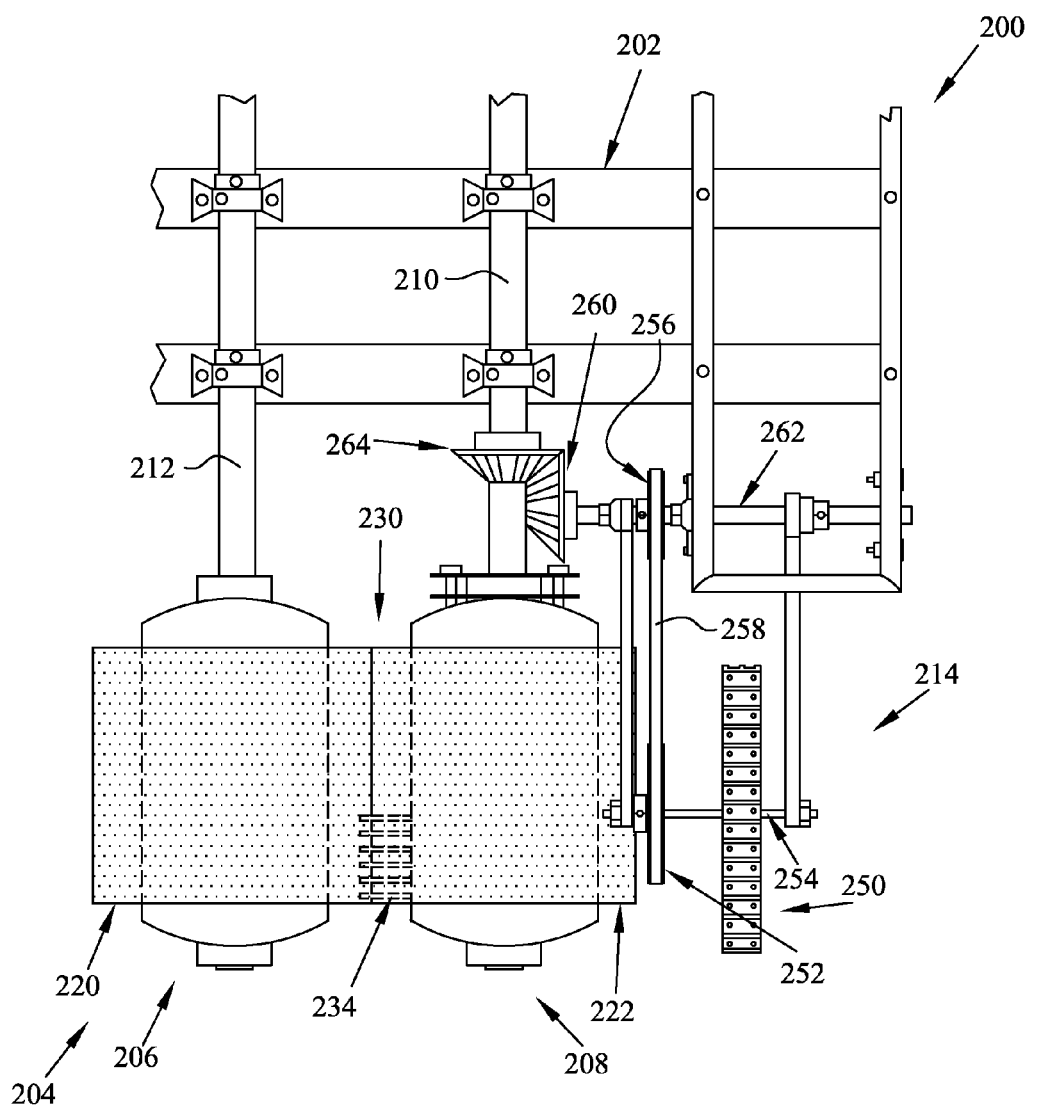
FIG. 3 is a front view of a portion the inoculation system of FIG. 2.

Inoculation system 100 may be a single row device in that it provides wounds on plants 132 of a single row as vehicle 102 is propelled along a row. An exemplary single row device is shown in FIGS. 2-4. Inoculation system may be a multi-row device in that it provides wounds on plants 132 of multiple rows 130 as vehicle 102 is propelled along a row. A multi-row device may consist of multiple single row devices coupled together, such as the exemplary single row device shown in FIGS. 2-4.

Figure 5:
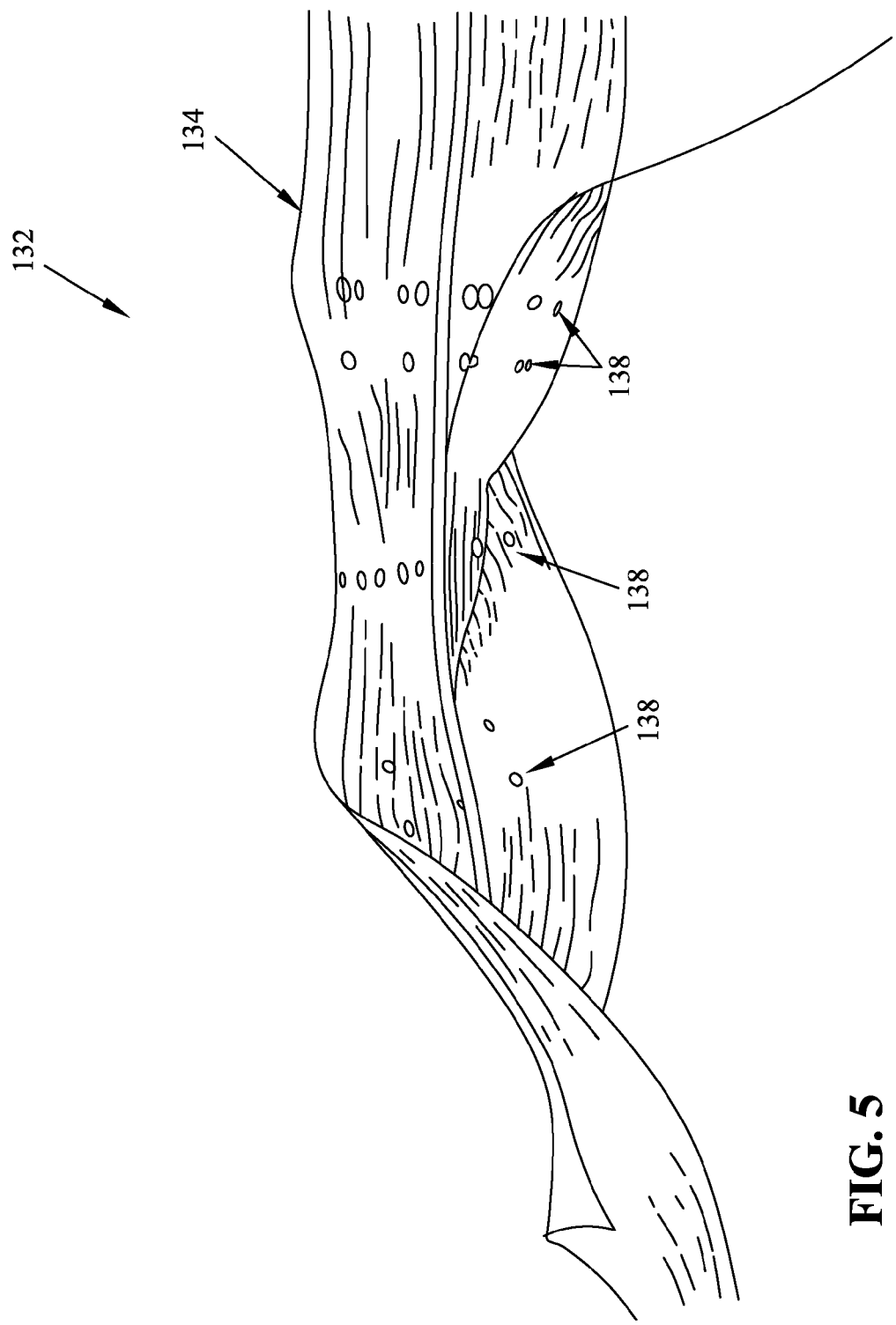
FIG. 5 illustrates the infected lesions produced on a leaf subsequent to wounding the leaf with the inoculation system of FIG. 2.

Referring to FIGS. 2-4, an exemplary inoculation system 200 is shown. Referring to FIG. 3, a front view of inoculation system 200 is shown. Inoculation system 200 includes a frame 202 and a feed system 204. Frame 202 is coupled to vehicle 102, such as a tractor. In one embodiment, frame 202 is coupled to a tractor between a front ground engaging member 104 of the tractor and a rear ground engaging member 104 of the tractor and to one side of the tractor. The frame 202 positions feed system 204 to align feed system 204 with a row 130 in a field. In one embodiment, a height adjustment system (not shown) is provided to raise and lower feed system 204 to vertically align feeds system 204 with the desired portions of plants 132, such as leaves 134 (see FIG. 5). In one embodiment, at least a portion of frame 202 is moveable by the height adjustment system to align feed system 204. An exemplary height adjustment system is one or more hydraulic cylinders which are operatively coupled to hydraulic system 110 of vehicle 102 and move a portion of frame 202 relative to the ground.

Referring to FIG. 4, feed system 204 includes a first rotating member 206, illustratively a cylinder, and a second rotating drum 208, illustratively a cylinder. Rotating members 206 and 208 are supported by shafts 210 and 212, respectively. A drive system 214 (see FIG. 3) drives the rotation of at least one of shafts 210 and 212 thereby causing the rotation of rotating members 206 and 208. Rotating member 206 rotates in direction 216. Rotating member 208 rotates in direction 218.

Rotating member 206 and rotating member 208 support pads 220 and 222, respectively. Pad 222 is made of a compressible material which also holds an inoculum. As pad 222 is compressible portions of the inoculum are released from pad 222. In the illustrated embodiment, both pad 220 and pad 222 are made of compressible materials and/or materials which hold an inoculum. Exemplary compressible materials which hold an inoculum include foams, sponges, and other suitable materials. Pads 220 and 222 are shown surrounding rotating members 206 and 208, respectively. In one embodiment, pads 220 and 220 may be localized to a particular region of rotating members 206 and 208, respectively.

Pads 220 and 222, as shown in FIG. 4, are compressed in a region 230 between rotating member 206 and rotating member 208. Region 230 generally corresponds to a track which receives plants 132 as vehicle 102 moves in direction 232. Pads 220 and 222 cooperate to capture a plant 132. In one embodiment, as described herein, the rotation speed of rotating members 206 and 208 is controlled to be generally equal or slightly greater than a speed of vehicle 102 in direction 232. This prevents the plant 132 from being uprooted during capture. Pads 220 and 222 while capturing plant 132 do not break plant 132 are due to the compressive-nature of pads 220 and 222.

Rotating member 206 further supports a plurality of wounds members 234. Wound members 234 are generally sharp instruments which pierce or otherwise cut plant 132. As shown in FIG. 4, eight groupings of radially extending wound members 234 are provided generally equally spaced about rotating member 208. As shown in FIG. 3, each grouping includes a plurality of vertically offset wound members 234.

Although eight groupings are illustrated more or less groupings may be used. Further, wound members 234 may be spaced about rotating member 208 in any desired pattern, whether in groupings or not. In addition, in one embodiment, both rotating members 206 and 208 support wound members. Exemplary wounds members include nails, blades, and other sharp instruments.

In one embodiment, wound members 234 are arranged in nine horizontal rows. Each row extends about a circumference of rotating member 208 with a spacing of about one half inch between adjacent wound members 234 in the row. Further, the spacing between adjacent rows of wound members 234 is about one half inch. The respective wound members 234 in each row are not aligned with the wound members in the adjacent rows. In one example, with the spacing between the wound members 234 in a given row being about one half inch, the wound members 234 in the adjacent rows are offset by about one quarter of an inch. As such, the wound members 234 in the two rows on either side of an intermediate row are generally vertically aligned and offset from the wound members 234 in the intermediate row by about one quarter of an inch.

As shown in FIG. 4, pad 222 in its uncompressed state, outside of region 230, covers wound members 234. When pad 222 is in its compressed state, generally within region 230, wound members 234 extend beyond pad 222. Further, wound members 234 extend into pad 220.

In one embodiment, wound members 234 are nails and rotating member 208 is a hollow cylinder. The nails are located from the inside of the cylinder and extend radially outward into pad 222. In one example, the nails are 1 inch nails which extend approximately 0.75 inches from an outer surface of the cylinder and pad 222 is a foam layer having a thickness of about 1 inch. As such, the nails are covered by approximately 0.25 inches of foam when pad 222 is in an uncompressed state and extend beyond the foam by approximately 0.25 inches when pad 222 is in a compressed state.

Turning to FIG. 3, feed system 204 is driven by drive system 214. Drive system 214 includes a drive wheel 250 which engages the ground and rotates as vehicle 102 moves in direction 232. Drive wheel 250 is coupled to an input pulley 252 through a shaft 254. Input pulley 252 is coupled to an output pulley 256 through a drive belt 258. Output pulley 256 is coupled to a first gear 260 through a shaft 262. First gear 260 is engaged with a second gear 264 which is coupled to shaft 210. As second gear 264 is rotated by first gear 260 rotating member 208 is rotated. Due to the contact between rotating members 206 and 208 in region 230, the rotation of rotating member 208 in direction 218 results in the rotation of rotating member 206 in direction 220.

In one embodiment, drive system 214 drives the rotation of rotating members 206 and 208 at a speed generally equal to the ground speed of vehicle 102. In one embodiment, drive system 214 drives the rotation of rotating members 206 and 208 at a speed slightly higher than the ground speed of vehicle 102. This permits feed system 204 to pull the plants 132 through quicker and release them prior to the plant 132 being pulled out by the roots.

In one example, rotating members are about 4.5 inches in diameter. Pad 220 and pad 222 are each about 1.0 inches thick, but are compressed to about 0.5 inches thick in region 230. This results in an effective diameter of rotating members 206 and 208 being about 5.5 inches. Drive wheel 250 has a diameter of 13 inches. As such, the ratio of the effective diameter of rotating members 206 and 208 to the diameter of drive wheel 250 is about 0.432. The relative sizes of input pulley 252 and output pulley 256 are selected to compensate for the non-unity ratio of the effective diameter of rotating members 206 and 208 to the diameter of drive wheel 250. A diameter of input pulley 252 is 6 inches. To provide an exact speed match between drive wheel 250 and rotating members 206 and 208, the diameter of output pulley 256 should be 2.54. A 2.5 inch diameter output pulley 256 was selected. This results in the speed of rotating members 206 and 208 being slightly higher than the speed of drive wheel 250 which is equal to the ground speed of vehicle 102.

In one embodiment, vehicle 102 is a tractor having two spaced apart front wheels 104 and drive wheel 250 is positioned in line with one of the front wheels of the tractor. The spacing of the front wheels is selected to permit the tractor to travel through the field with each front wheel located between two adjacent rows 130. In one example, region 230 and hence the row aligned with feed system 204 is offset from a centerline of drive wheel 250 by about 15 inches.

As mentioned herein, at least portions of frame 202 may raised or lowered with a height adjustment system, such as hydraulic cylinders. A tensioning member 270 couples drive wheel 250 to frame 202. In this manner inoculation system 200 may be raised to permit travel on a road surface without drive wheel 250 engaging the road surface. Exemplary tensioning members include the illustrated chain.

Referring to FIG. 2, an exemplary pathogen delivery system 300 is shown. Pathogen delivery system 300 communicates an inoculum containing the pathogen from a reservoir 302 to one or both of pads 220 and 222. Pathogen delivery system 300 maintains the integrity of the pathogen to ensure that it is able to interact with the plants 132 to which it is ultimately communicated. Pathogen delivery system 300 maintains the pressure experienced by the inoculum at up to about 2 pounds per square inch (psi).

Reservoir 302 is supplied with a quantity of inoculum. The location of reservoir 302 is selected such that gravity will cause the inoculum to flow through a fluid conduit 304 towards a nozzle 306 positioned proximate to rotating members 206 and 208. Nozzle 306 has an associated adjustable regulator 308 which sets the pressure that the fluid in fluid conduit 304 should be at or above to exit nozzle 306.

In addition to gravity, a pump 310 is in fluid communication with a top portion of reservoir 302. Pump 310 is an air pump which provides a volume of pressurized air above the inoculum in reservoir 302. In one example, pump 310 is a twelve volt tire pump. Reservoir 302 also includes a 0-5 psi relief valve or pressure regulator 314 to keep pump 310 from over-pressurizing the volume of air above the inoculum. In one example, the relief valve 314 is set to about 2 psi, such that the volume of air may be pressurized up to a pressure of about 2 psi. In one embodiment, a pressure gauge 316 is provided to provide a visual indicator to an operator of the pressure in fluid conduit 304.

The pathogen delivery system may be setup in the following manner. The inoculum is placed in reservoir 302. Regulator 308 associated with nozzle 306 is set to about 0 psi. This resulted in a drip from the nozzle due to gravity. Pump 310 is activated and relief valve 314 is set to about 0 psi. Relief valve is adjusted until a steady drip/spray is exiting nozzle 306. In one embodiment, the pressure setting of relief valve 314, and hence the pressure of the volume of air in reservoir 302, corresponding to a steady drip/spray exiting from nozzle 306 is about 2 psi. Nozzle 306 is positioned to direct the inoculum onto pad 222 and/or pad 220.

Inoculation system 200 may be used in the following manner. The pathogen delivery system 300 is setup to provide a steady drip/spray of inoculum from nozzle 306. This communicates the inoculum to pad 222 and/or pad 220. For purposes of discussion, the inoculum is discussed in relation with pad 222. Pad 222 absorbs or holds the inoculum.

Vehicle 102 is positioned such that region 230 of feed system 204 is generally aligned with a given row 130 of plants. Vehicle 102 is advanced in direction 232 causing drive wheel 250 of drive system 214 to rotate. The rotation of drive wheel 250 results in the rotation of rotating members 206 and 208 in directions 216 and 218, respectively.

As a plant 132 of row 130 is encountered, it is captured between pad 220 and pad 222. The advancement of plant 132 within region 230 compresses pad 220 and pad 222 to bring a portion of wound members 234 into contact with leaves 134 of plant 132. Wound members 234 pierce leaves 134 resulting in wounds in leaves 134. As wound members 234 are piercing leaves 134, the inoculum being held by pad 222 and/or pad 220 is forced out of the pad due to the compression of the pad. Some of the inoculum clings to the wound members 234.

As plant 132 further advances within region 230, the wound members 234 are retracted relative to the leaves 134 due to the further rotation of rotating member 208. At the same time pad 222 is expanding back towards its uncompressed state. As pad 222 expands it wipes the inoculum off wound members 234. It is believed that this causes the inoculum to be forced into the edges of the wounds created by the wound members 234 (which may still be partially in the wound); thereby providing a safe harbor for the organism to initiate an infection. The result of this process is the development of lesions 138 (see FIG. 5) on the leaves 134 of plants 132. The location of lesions 138 correspond to the locations of the wounds produced by wound members 234.

Other attempts used a wire brush to create wounds in the plants and the pathogen delivery system 300. However, with this setup lesions 138 were not adequately caused. It is believed that system 200 is able to cause lesions 138 because it forces the inoculum into the edges of the wounds created by the wound members 234.

Although the invention has been described in detail with reference to certain preferred embodiments, variations and modifications exist within the spirit and scope of the invention as described and defined in the following claims.

The invention claimed is:

1. An inoculation system for use with a vehicle to inoculate plants arranged in a row, the inoculation system comprising:
    a frame supported by the vehicle;
    a feed system which receives in series the plants arranged in the row, provides a plurality of wounds in each of the received plants with a plurality of wound members, and communicates a pathogen to the plurality of wounds; and
    a drive system which moves the plurality of wound members relative to the received plants, the drive system including a drive wheel which engages the ground and rotates as vehicle moves, the drive wheel being operatively coupled to the plurality of wound members to power movement of the plurality of wound members.

2. The inoculation system of claim 1, wherein the feed system includes a first rotating member and a second rotating member, the plants arranged in the row being received between the first rotating member and the second rotating member.

3. The inoculation system of claim 2, wherein at least one of the first rotating member and the second rotating member support a pad which holds the pathogen and communicates the pathogen to the plurality of wounds provided in the received plants.

4. The inoculation system of claim 3, wherein the pad is compressed in a region between the first rotating member and the second rotating member and the pathogen is forced out of the pad and to the plurality of wounds provided in the received plants due to the compression of the pad.

5. The inoculation system of claim 4, wherein the pad is a foam layer.

6. The inoculation system of claim 4, further comprising a pathogen delivery system which communicates the pathogen to the pad.

7. The inoculation system of claim 6, wherein the pathogen delivery system comprises
    a fluid reservoir holding an inoculum containing the pathogen;
    a fluid conduit in fluid communication with the fluid reservoir;
    a nozzle in fluid communication with the fluid conduit, the nozzle communicating the inoculum onto the pad;
    a pressure regulator which controls a pressure of the inoculum provided to the nozzle; and
    a pump which provides a positive pressure on the inoculum prior to being expelled from the nozzle.

8. The inoculation system of claim 7, wherein the pump is in fluid communication with the reservoir and increases the positive pressure on the inoculum within the reservoir.

9. The inoculation system of claim 8, wherein the pump provides a pressurized volume of air in the reservoir above the inoculum and the pressure regulator is a relief valve in fluid communication with the pressurized volume of air.

10. The inoculation system of claim 9, wherein the pressure regulator keeps the pressurized volume of air with a pressure of up to about 2 psi.

11. The inoculation system of claim 2, wherein at least one of the first rotating member and the second rotating member support the plurality of wound members, the drive system rotating the at least one of the first rotating member and the second rotating member to move the plurality of wound members relative to the received plants.

12. The inoculation system of claim 11, wherein the plurality of wound members are spaced apart radially extending pointed instruments.

13. The inoculation system of claim 12, wherein the pointed instruments are nails.

14. The inoculation system of claim 12, wherein at least one of the first rotating member and the second rotating member support a pad which carries the pathogen and communicates the pathogen to the plurality of wounds provided in the received plants by the plurality of spaced apart radially extending pointed instruments, wherein the pad is compressed in a region between the first rotating member and the second rotating member and the pathogen is forced out of the pad and to the plurality of wounds provided in the received plants due to a compression of the pad.

15. The inoculation system of claim 14, wherein the pad coats the plurality of spaced apart radially extending pointed instruments with the pathogen.

16. The inoculation system of claim 1, wherein the drive system moves the plurality of wound members at a speed approximate to a ground speed of the vehicle.

17. An inoculation system for use with a vehicle to inoculate plants arranged in a row, the inoculation system comprising:
    a frame supported by the vehicle;
    a feed system which receives in series the plants arranged in the row between a first rotating member of the feed system and a second rotating member of the feed system, provides a plurality of wounds in each of the received plants with a plurality of wound members, and communicates a pathogen to the plurality of wounds, the plurality of wound members are spaced apart radially extending pointed instruments; and a drive system which moves the plurality of wound members relative to the received plants, wherein at least one of the first rotating member and the second rotating member support the plurality of wound members, the drive system rotating the at least one of the first rotating member and the second rotating member to move the plurality of wound members relative to the received plants and wherein at least one of the first rotating member and the second rotating member support a pad which carries the pathogen and communicates the pathogen to the plurality of wounds provided in the received plants by the plurality of spaced apart radially extending pointed instruments, wherein the pad is compressed in a region between the first rotating member and the second rotating member and the pathogen is forced out of the pad and to the plurality of wounds provided in the received plants due to a compression of the pad, wherein while a radially extending pointed instrument is in a region between the first rotating member and the second rotating member a point of the radially extending pointed instrument extends out of the pad and while the radially extending pointed instrument is outside of the region the point of the radially extending pointed instrument is covered by the pad.

* * * * *